United States Patent
Iwabuchi et al.

(10) Patent No.: US 11,212,033 B2
(45) Date of Patent: Dec. 28, 2021

(54) TRANSMISSION APPARATUS, RECEPTION APPARATUS, AND COMMUNICATION METHOD

(71) Applicant: NTT DOCOMO, INC., Tokyo (JP)

(72) Inventors: Masashi Iwabuchi, Tokyo (JP); Anass Benjebbour, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/644,304

(22) PCT Filed: Sep. 5, 2017

(86) PCT No.: PCT/JP2017/031992
§ 371 (c)(1),
(2) Date: Mar. 4, 2020

(87) PCT Pub. No.: WO2019/049212
PCT Pub. Date: Mar. 14, 2019

(65) Prior Publication Data
US 2021/0184787 A1    Jun. 17, 2021

(51) Int. Cl.
*H04L 1/00*    (2006.01)
*H04W 24/10*   (2009.01)
*H04W 28/18*   (2009.01)

(52) U.S. Cl.
CPC .......... *H04L 1/0017* (2013.01); *H04L 1/0003* (2013.01); *H04L 1/0007* (2013.01);
(Continued)

(58) Field of Classification Search
CPC ... H04L 1/0017; H04L 1/0007; H04L 1/0003; H04L 1/0009; H04L 1/0026; H04L 1/0035; H04W 24/10; H04W 28/18
See application file for complete search history.

(56) References Cited

U.S. PATENT DOCUMENTS 6,567,375 B2 *  5/2003  Balachandran ....... H04L 1/0003
                                                    370/204
9,515,804 B2 * 12/2016  Terry .................... H04L 1/1822
(Continued)

FOREIGN PATENT DOCUMENTS

CN    101641923 A *  2/2010
EP      1806859 A1    7/2007
(Continued)

OTHER PUBLICATIONS

Channel Adaptive CQI Reporting Schemes for HSDPA Systems; Soo-Yong Jeon, Student Member, IEEE, and Dong-Ho Cho, Senior Member, IEEE; IEEE Communications Letters, vol. 10, No. 6, Jun. 2006 (Year: 2006).*

(Continued)

*Primary Examiner* — Deepa Belur
(74) *Attorney, Agent, or Firm* — Osha Bergman Watanabe & Burton LLP

(57) ABSTRACT

To perform appropriate AMC control even if low latency is required. A transmission apparatus includes: a reception section that receives channel quality information communicated between the transmission apparatus and a reception apparatus; a control section that determines one or more first candidates for a value indicating a coding and modulation scheme based on the channel quality information, determines one or more second candidates for a value indicating the coding and modulation scheme based on a parameter related to service quality required for a service communicated between the transmission apparatus and the reception apparatus, and selects a value included in both of the first candidates and the second candidates; and a transmission section that transmits transmission data using the coding and modulation scheme corresponding to the selected value.

6 Claims, 12 Drawing Sheets

(52) U.S. Cl.
CPC .......... *H04L 1/0009* (2013.01); *H04L 1/0026* (2013.01); *H04L 1/0035* (2013.01); *H04W 24/10* (2013.01); *H04W 28/18* (2013.01)

(56) References Cited

U.S. PATENT DOCUMENTS

| | | | |
|---|---|---|---|
| 10,425,201 B2 * | 9/2019 | Kim ..................... | H04B 7/0617 |
| 2014/0126359 A1 * | 5/2014 | Sarkar ............... | H04W 72/0486 370/230 |
| 2016/0057808 A9 * | 2/2016 | Chandra ........... | H04W 72/0453 370/328 |

FOREIGN PATENT DOCUMENTS

| | | | | |
|---|---|---|---|---|
| EP | 2999147 A1 * | 3/2016 | ......... | H04B 17/3912 |
| JP | 2012-029313 A | 2/2012 | | |
| JP | 2015-512213 A | 4/2015 | | |
| JP | 2015-525521 A | 9/2015 | | |
| JP | 2016-535521 A | 11/2016 | | |
| WO | WO-2007079058 A2 * | 7/2007 | ........... | H04L 1/0003 |

OTHER PUBLICATIONS

International Search Report issued in PCT/JP2017/031992 dated Nov. 28, 2017 (12 pages).
Written Opinion of the International Searching Authority issued in PCT/JP2017/031992 dated Nov. 28, 2017 (6 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)"; Jun. 2017 (460 pages).
Extended European Search Report issued in European Application No. 17924141.9, dated Mar. 19, 2021 (8 pages).

* cited by examiner

| MCS index | Modulation Order | TBS index |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

FIG. 2

| INDEX | PACKET SIZE | DELAY |
|---|---|---|
| 0 | NO CONDITION | |
| 1 | 32 | 5ms |
| 2 | 32 | 2ms |
| 3 | 32 | 1ms |
| 4 | 50 | 5ms |
| 5 | 50 | 2ms |
| 6 | 50 | 1ms |
| 7 | 100 | 5ms |
| 8 | 100 | 2ms |
| 9 | 100 | 1ms |
| 10 | 200 | 5ms |
| 11 | 200 | 2ms |
| 12 | 200 | 1ms |
| 13 | 300 | 5ms |
| 14 | 300 | 2ms |
| 15 | 300 | 1ms |

FIG. 11

TRANSMISSION APPARATUS, RECEPTION APPARATUS, AND COMMUNICATION METHOD

TECHNICAL FIELD

The present invention relates to a transmission apparatus, a reception apparatus, and a communication method.

BACKGROUND ART

Long Term Evolution (LTE) has been specified for achieving a higher data rate, lower latency, and the like in a Universal Mobile Telecommunications System (UMTS) network (see Non-Patent Literature (hereinafter referred to as "NPL") 1). Successor systems of LTE (for example, the systems called LTE-Advanced (LTE-A), Future Radio Access (FRA), 5th generation mobile communication system (5G), 5G plus (5G+), New Radio Access Technology (New-RAT), and the like) have also been studied for achieving a broader bandwidth and a higher speed based on LTE.

Future radio communication systems (for example, 5G) perform adaptive modulation and coding (AMC) control that adaptively changes at least one of a modulation scheme and a coding rate (for example, see NPL 1). In the AMC control, for example, a transmission apparatus that transmits data adaptively sets at least one of a modulation scheme and a coding rate of the data based on a Channel Quality Indicator (CQI) fed back from a reception apparatus that receives the data. The transmission apparatus then notifies the reception apparatus a combination of the set modulation scheme and coding rate (MCS: Modulation and Coding Scheme) and transmits the data according to the MCS.

CITATION LIST

Non-Patent Literature

NPL 1 3GPP TS 36.213 v14.3.0, "Evolved Universal Terrestrial Radio Access (E-UTRA); Physical layer procedures (Release 14)," June 2017

SUMMARY OF INVENTION

Technical Problem

In future radio communication systems, an AMC control method is not sufficiently studied in the case where low latency is required like ultra reliable and low latency communications (URLLC).

An aspect of the present invention is to provide a transmission apparatus, a reception apparatus, and a communication method capable of appropriate AMC control even when low latency is required.

Solution to Problem

A transmission apparatus according to one aspect of the present invention includes: a reception section that receives channel quality information communicated between the transmission apparatus and a reception apparatus; a control section that determines one or more first candidates for a value indicating a coding and modulation scheme based on the channel quality information, determines one or more second candidates for a value indicating the coding and modulation scheme based on a parameter related to service quality required for a service communicated between the transmission apparatus and the reception apparatus, and selects a value included in both of the first candidates and the second candidates; and a transmission section that transmits transmission data, using the coding and modulation scheme corresponding to the selected value.

Advantageous Effects of Invention

According to an aspect of the present invention, it is possible to appropriately perform AMC control even when low latency is required.

BRIEF DESCRIPTION OF DRAWINGS

FIG. 2 illustrates an exemplary MCS table;

FIG. 11 illustrates an exemplary notification of service requirement quality information according to Embodiment 2.

DESCRIPTION OF EMBODIMENTS

Hereinafter, an embodiment of the present invention will be described with reference to the accompanying drawings.

Embodiment 1

First, AMC control in a conventional system such as LTE will be described.

In the conventional AMC control, an MCS index is selected using a channel quality indicator (CQI) indicating channel quality between a transmission apparatus and a reception apparatus.

Specifically, the transmission apparatus transmits a reference signal (RS) to the reception apparatus. The reception apparatus uses the reference signal to measure channel quality between the transmission apparatus and the reception apparatus. Note that, the channel quality may be, for example, a Signal to Interference Plus Noise Ratio (SINR), Signal to Noise Ratio (SNR), Signal to Interference Ratio (SIR), or the like.

Figure 1:
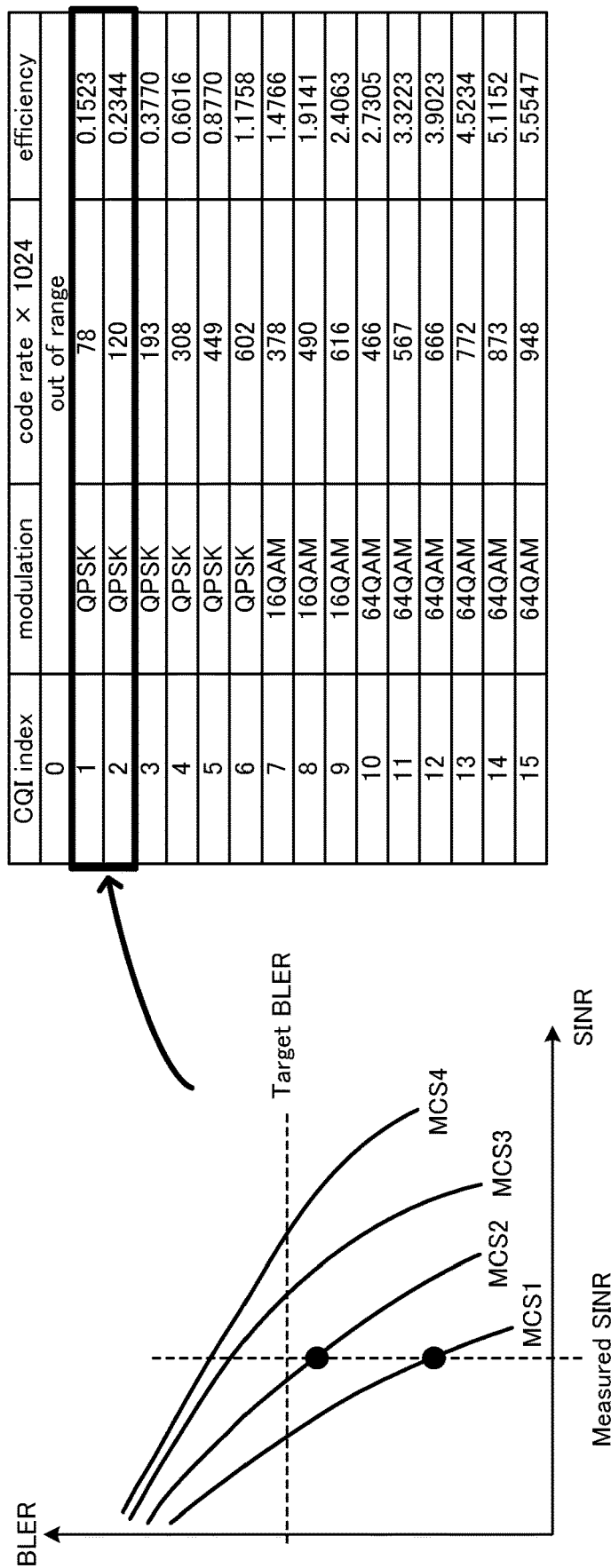
FIG. 1 illustrates an exemplary determination method of a CQI table and a CQI index.

The reception apparatus then determines a CQI (CQI index) based on the measured channel quality. FIG. 1 illustrates an exemplary determination method of a CQI table and a CQI. In the example illustrated in FIG. 1, the CQI table associates a CQI (CQI index), modulation scheme (modulation), coding rate (code rate×1024), and spectrum efficiency (efficiency). For example, in FIG. 1, CQI indexes are sequentially assigned in ascending order with respect to the spectrum efficiency.

As illustrated in FIG. 1, on the basis of the measured channel quality (SINR in FIG. 1), the reception apparatus determines a CQI corresponding to a combination of a modulation scheme and a coding rate (that is, MCS) applicable to data transmitted and received on a channel between the transmission apparatus and the reception apparatus. Here, the modulation scheme and coding rate applicable to data are, for example, a modulation scheme and a coding rate that satisfy a condition that an error rate for data (for example, BLER: Block Error Rate) is equal to or less than a predetermined target error rate (target BLER. for example, 0.1).

In FIG. 1, combinations of the modulation scheme and coding rate that satisfy a condition that the measured SINR is equal to or less than the target BLER are MCS1 and MCS2. Therefore, the reception apparatus selects any one (for example, a CQI index having the largest index number=2) from CQI indexes=1 and 2 corresponding to MCS1 and MCS2 respectively in the CQI table illustrated in FIG. 1. The reception apparatus then feeds back the determined CQI index to the transmission apparatus.

The transmission apparatus uses the CQI index fed back from the reception apparatus to select an MCS index. For example, the transmission apparatus refers to the CQI table illustrated in FIG. 1 to identify a modulation scheme and a coding rate corresponding to the CQI index fed back from the reception apparatus. The transmission apparatus then refers to, for example, an MCS table illustrated in FIG. 2 to determine an MCS index indicating a modulation order corresponding to the identified modulation scheme and a transport block size (TBS) index corresponding to the identified coding rate. The transmission apparatus then notifies the reception apparatus of the determined MCS index.

The transmission apparatus uses the coding rate and a modulation scheme corresponding to the determined MCS index to perform coding processing and modulation processing on transmission data and then transmits the transmission data to the reception apparatus. On the other hand, the reception apparatus identifies the coding rate and modulation scheme of the transmission data based on the MCS index notified from the transmission apparatus, and uses the identified coding rate and the modulation scheme to perform demodulation processing and decoding processing on received data.

As described above, in the conventional AMC control, the MCX index is selected in consideration of the channel quality (radio quality) between the transmission apparatus and the reception apparatus. Specifically, in the conventional AMC control, high-speed communication is achieved based on the method of selecting the largest MCS index among MCSs allowing the target error rate to be achieved.

By the way, application of new applications such as self-driving and robot control is assumed in future radio communication systems (for example, 5G). In such applications, discussion is being made on communication (for example, URLLC) that achieves high reliability and low latency as described above.

Even if the above-described AMC control is applied to URLLC, however, there is a risk that the MCS index may not be appropriately selected and delay may occur, so that requirements of URLLC cannot be satisfied.

Specifically, when the MCS index is set high giving high priority to high throughput, an arrival rate (error rate) of the transmission data (packet) tends to deteriorate due to a change in channel quality. In addition, when the transmission data does not reach the reception apparatus (when the packet is lost), the transmission apparatus needs to retransmit the transmission data, thereby increasing delay.

In URLLC, in order to improve reliability, a target error rate (for example, target BLER) which is a reference when the CQI index is selected is supposed to be set low compared with a communication service (for example, including eMBB) to which another application is applied. In URLLC, in order to improve reliability, it is required to achieve stable communication rather than achieving high-speed communication. Therefore, in URLLC, it is desired to select a robust CQI index coping with a wide range of channel quality irrespective of channel quality fluctuation. For these reasons, in URLLC, there is a high possibility of selecting a lower CQI index, that is, a lower MCS index than when other applications are applied.

On the other hand, in the AMC control described above, when an MCS index is low, a transport block size (TBS) corresponding to the determined MCS index is also set small, and a packet size of transmission data tends to be larger than the transport block. In this case, because the transmission data is divided into a plurality of transport blocks and transmitted, delay increases.

In this way, depending on the AMC control, the packet arrival rate deteriorates and delay increases due to an increase in the number of retransmissions or an increase in the number of transport blocks necessary for data transmission. For this reason, it is necessary to satisfy requirements by using a method different from the conventional AMC control in communication having severe requirements on delay such as URLLC.

Therefore, in a present embodiment, a method capable of appropriate AMC control even when low latency is required like URLLC will be described. Specifically, in the embodiment, a transmission apparatus selects an MCS index within a range between an MCS index determined based on a CQI index (that is, channel quality) fed back from a reception apparatus and an MCS index determined based on a packet size of data transmitted by the transmission apparatus.

Radio Communication System

Figure 3:
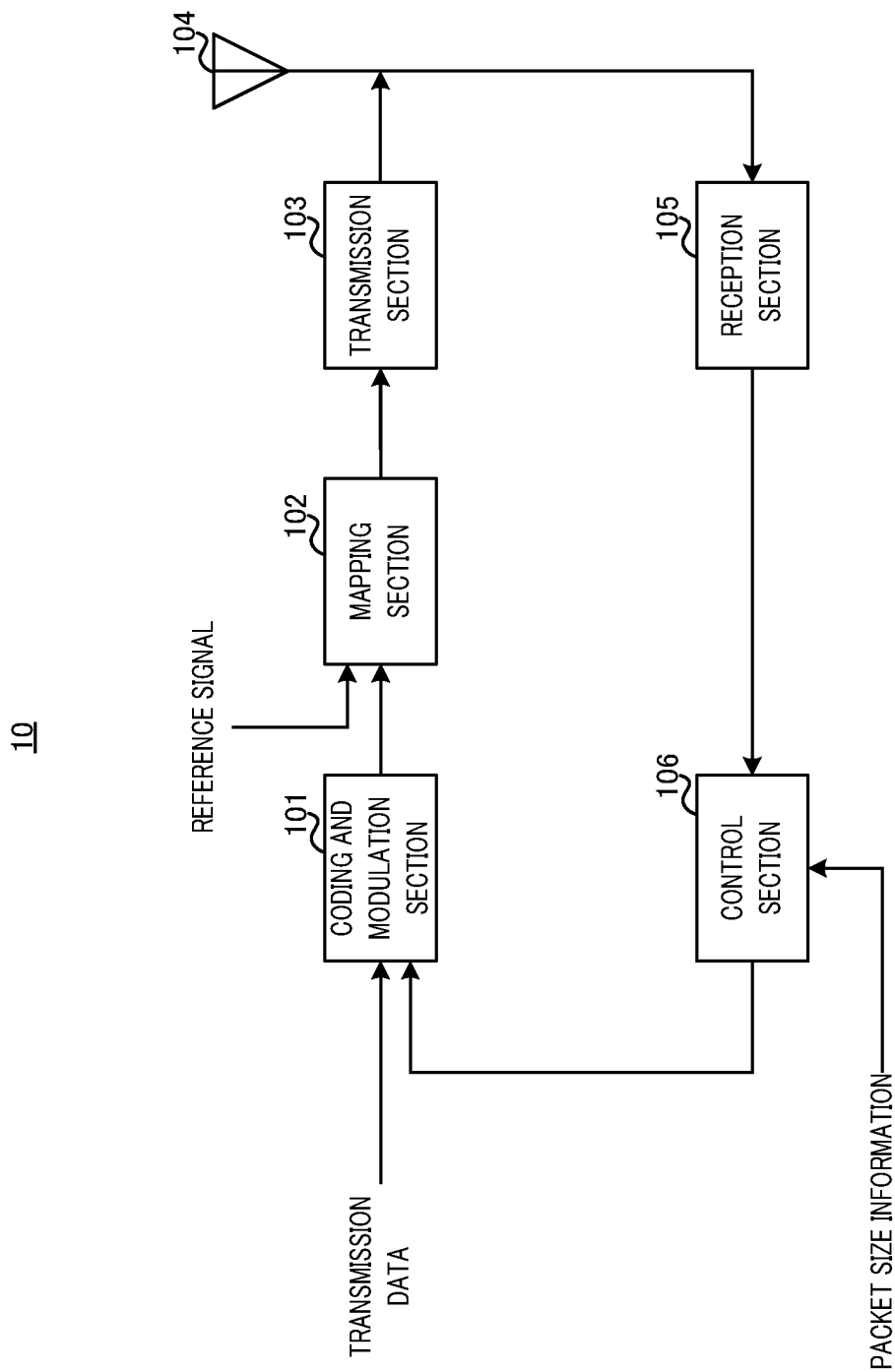
FIG. 3 is a block diagram illustrating an exemplary configuration of a transmission apparatus according to Embodiment 1.
Figure 4:
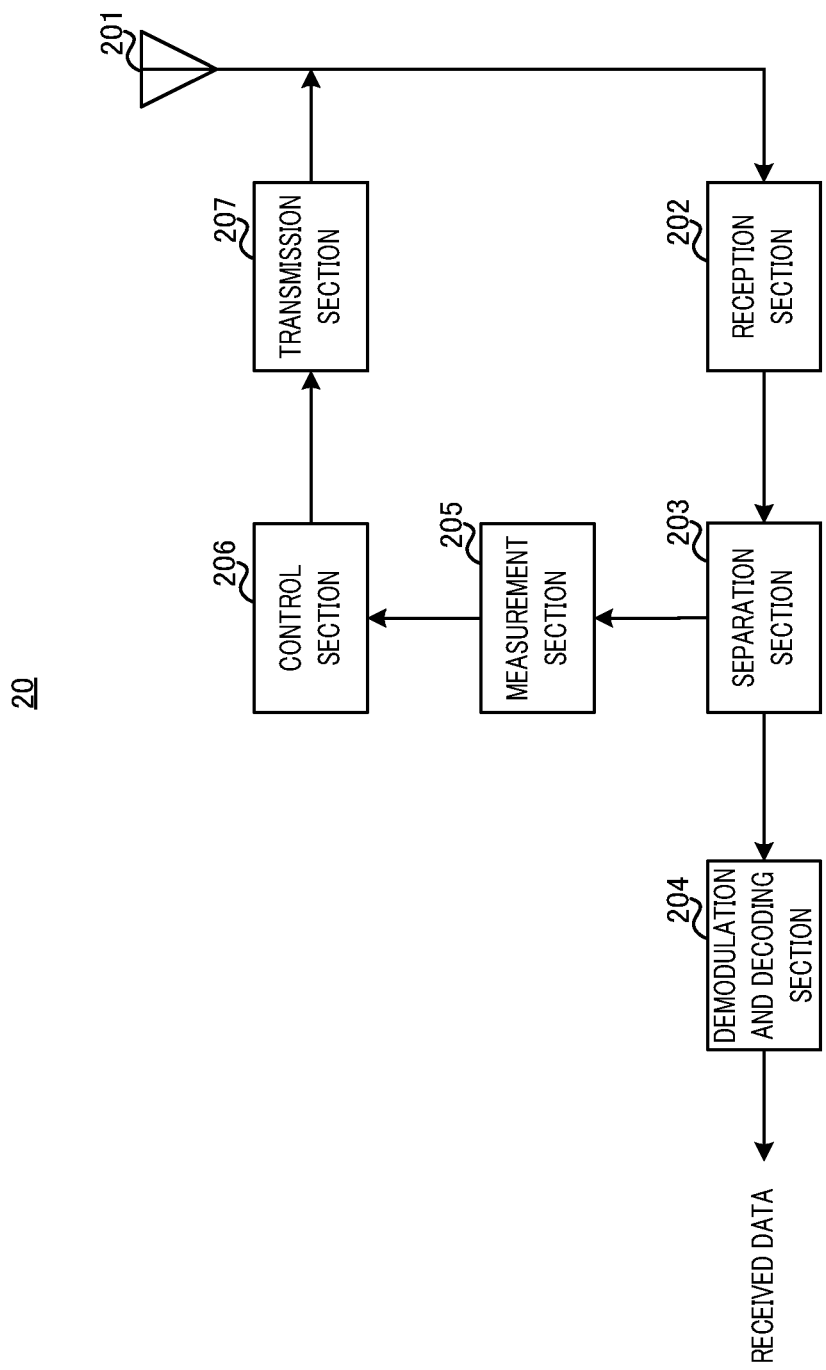
FIG. 4 is a block diagram illustrating an exemplary configuration of a reception apparatus according to Embodiment 1.

A radio communication system according to the embodiment includes at least transmission apparatus 10 illustrated in FIG. 3 and reception apparatus 20 illustrated in FIG. 4.

The radio communication system is a system that performs communication of, for example, a downlink, an uplink, or a sidelink. For example, in the downlink, transmission apparatus 10 is a radio base station (which may also be referred to as eNB or gNB) and reception apparatus 20 is a user terminal (which may also be referred to as User Equipment (UE)) that accesses the radio base station. In the uplink, transmission apparatus 10 is a user terminal that accesses a radio base station and reception apparatus 20 is the radio base station. In the sidelink, transmission apparatus 10 and reception apparatus 20 are apparatuses that perform direct communication.

In FIGS. 3 and 4, signal waveforms generated by transmission apparatus 10 and reception apparatus 20 may be signal waveforms based on Orthogonal Frequency Division Multiplexing (OFDM) modulation, may be signal waveforms based on Single Carrier-Frequency Division Multiple Access (SC-FCMA) or DFT-Spread-OFDM (DFT-S-OFDM), and may be other signal waveforms. In FIGS. 3 and 4, descriptions of constituent sections (for example, Inverse Fast Fourier Transform (IFFT) processing section, Cyclic Prefix (CP) adding section, CP removal section, Fast Fourier Transform (FFT) processing section, and the like) for generating signal waveforms are omitted.

Transmission Apparatus

FIG. 3 illustrates an exemplary overall configuration of transmission apparatus 10 according to the embodiment. Transmission apparatus 10 illustrated in FIG. 3 adopts a configuration including coding and modulation section 101, mapping section 102, transmission section 103, antenna 104, reception section 105, and control section 106.

Coding and modulation section 101 performs coding processing and modulation processing on input transmission data based on MCS information (coding rate and modulation scheme) input from control section 106. Coding and modulation section 101 outputs transmission data after modulation to mapping section 102.

Coding and modulation section 101 also performs coding processing and modulation processing on a control signal including MCS information (for example, MCS index) input from control section 106. Coding and modulation section 101 outputs a control signal after modulation to mapping section 102.

Mapping section 102 maps the transmission data or control signal input from coding and modulation section 101 to a predetermined radio resource. Mapping section 102 also maps a reference signal (RS) to a predetermined radio resource. Mapping section 102 outputs the signals mapped to the radio resources to transmission section 103.

Transmission section 103 performs transmission processing such as up-conversion and amplification on the signals input from mapping section 102, and transmits a radio frequency signal from antenna 104.

Reception section 105 performs reception processing such as amplification and down-conversion on a radio frequency signal received by antenna 104, and outputs a reception signal to control section 106.

Control section 106 extracts CQI information (for example, CQI index) included in the reception signal input from reception section 105. Control section 106 then determines an MCS index based on the CQI index and a packet size of transmission data indicated in input packet size information. Control section 106 outputs MCS information indicating the determined MCS index to coding and modulation section 101.

Note that, the packet size indicated in the packet size information may be, for example, determined by an unshown scheduler or signaled from another apparatus (for example, reception apparatus 20).

Reception Apparatus

FIG. 4 illustrates an exemplary overall configuration of a reception apparatus according to the embodiment. Reception apparatus 20 illustrated in FIG. 4 adopts a configuration including antenna 201, reception section 202, separation section 203, demodulation and decoding section 204, measurement section 205, control section 206, and transmission section 207.

Reception section 202 performs reception processing such as amplification and down-conversion on a radio frequency signal received by antenna 201, and outputs a reception signal to separation section 203. The reception signal includes, for example, a reference signal, data signal or control signal.

Separation section 203 separates the data signal or the control signal from the reception signal input from reception section 202 and outputs the separated signal to demodulation and decoding section 204. Separation section 203 also separates the reference signal from the reception signal and outputs the separated reference signal to measurement section 205.

Demodulation and decoding section 204 performs demodulation processing and decoding processing on the control signal input from separation section 203. Demodulation and decoding section 204 then performs demodulation and decoding processing on the data signal input from separation section 203 based on an MCS index indicated in MCS information included in the control signal. Demodulation and decoding section 204 transfers a data signal after demodulation to an application section (not illustrated). Note that, the application section performs processing or the like relating to upper layers than a physical layer or a MAC layer.

Measurement section 205 uses the reference signal input from separation section 203 to measure channel quality (for example, an SINR, SNR, SIR, or the like) between transmission apparatus 10 and reception apparatus 20. Measurement section 205 outputs a measurement value of channel quality to control section 206.

Control section 206 determines a CQI index based on the measurement value of channel quality input from measurement section 205 (for example, see FIG. 1). Control section 206 outputs CQI information indicating the determined CQI index to transmission section 207.

Transmission section 207 performs transmission processing such as up-conversion and amplification on the CQI information input from control section 206, and transmits a radio frequency signal from antenna 201.

MCS Index Selection Method

Next, a method of selecting an MCS index in above-described transmission apparatus 10 will be described in detail.

Transmission apparatus 10 (control section 106) limits a range of the MCS index selectable for data based on the CQI index fed back from reception apparatus 20 and a packet size of the data to be transmitted by transmission apparatus 10.

Figure 5:
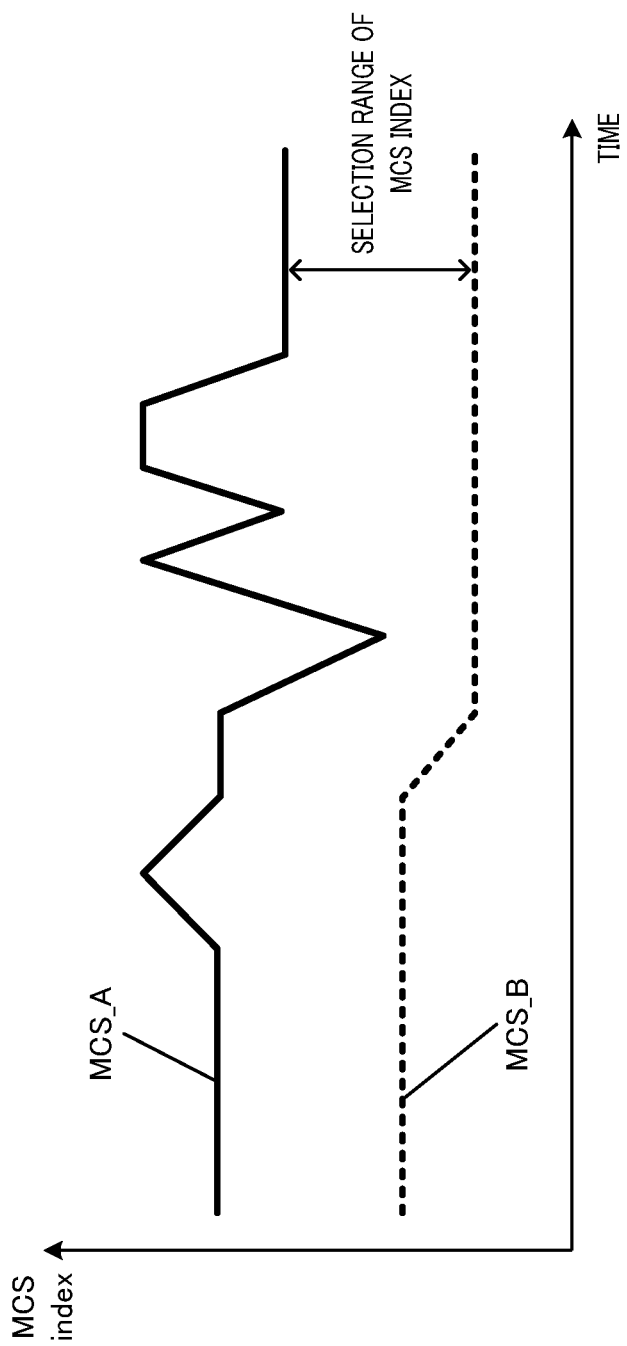
FIG. 5 illustrates an exemplary MCS selection processing according to Embodiment 1.

FIG. 5 illustrates an exemplary MCS index selection method according to the embodiment.

Specifically, transmission apparatus 10 determines an MCS index (denoted as "MCS_A") using the CQI index fed back from reception apparatus 20 in the same manner as the method described in FIG. 1. In other words, MCS_A is an MCS index that satisfies a target error rate (that is, a predetermined packet arrival rate) on a channel between transmission apparatus 10 and reception apparatus 20.

Transmission apparatus 10 also determines an MCS index (denoted as "MCS_B") based on the packet size. Here, a transport block size (TBS) calculated using MCS_B is a transport block size allowing transmission apparatus 10 to transmit data corresponding to the packet size indicated in packet size information using transport blocks equal to or less than a predetermined number. In other words, transmission apparatus 10 determines an MCS index corresponding to the transport block size that allows data of the packet size to be transmitted using the predetermined number of transport blocks to be MCS_B. For example, transmission apparatus 10 selects as MCS_B an MCS index that makes a calculated transport block size equal to or more than the packet size of the transmission data. Note that, the predetermined number is, for example, the number of transport blocks corresponding to allowable delay (delay time).

Transmission apparatus 10 then sets a range between MCS_A determined based on the channel quality as an upper limit and MCS_B determined based on the packet size as a lower limit as a selection range of the MCS index as illustrated in FIG. 5. Transmission apparatus 10 selects any one MCS index from the set selection range. Transmission apparatus 10 then transmits the selected MCS index to reception apparatus 20.

By setting MCS_A determined based on the CQI index, that is, the channel quality (target error rate), to the upper limit of the selection range of the MCS index, a predetermined error rate can be guaranteed for data to be transmitted. By setting MCS_B determined based on the packet size to the lower limit of the selection range of the MCS index, it is possible to prevent data to be transmitted from transmission apparatus 10 from being divided into and transmitted by more transport blocks than the number of transport blocks within which delay is allowed. That is, by setting the lower limit value of the MCS index, occurrence of delay caused by division of a transmission packet can be suppressed and low latency can be guaranteed.

Transmission apparatus 10 may select an MCS index from the set selection range of the MCS index, for example, in consideration of balance between high-speed communication, high reliability, and the like depending on a service.

For example, by selecting an MCS index closer to MCS_A (upper limit value) from the selection range of the MCS index illustrated in FIG. 5, transmission apparatus 10 can transmit data putting priority on high-speed communication. Note that, for a service requiring low latency like URLLC, it is assumed that the target error rate is set lower compared with other services as described above. Therefore, in URLLC or the like, it is assumed that MCS_A becomes lower, and the transport block size becomes smaller. However, as illustrated in FIG. 5, because MCS_B (lower limit value of the MCS index) corresponding to the transport block size by which delay is allowed is set based on the packet size, by selecting an MCS index from the selection range of the MCS index, transmission apparatus 10 enables low latency and high-speed communication.

For example, by selecting an MCS index closer to MCS_B (lower limit value) from the selection range of the MCS index illustrated in FIG. 5, transmission apparatus 10 enables robust communication coping with an environment with large channel quality fluctuation or a wide range of channel quality putting priority on reliability. Specifically, the value of MCS_A fluctuates in response to a fluctuation in channel quality between transmission apparatus 10 and reception apparatus 20. On the other hand, by selecting an MCS index closer to MCS_B, transmission apparatus 10 enables communication satisfying the target error rate (packet arrival rate) while maintaining low latency even if a sudden fluctuation in channel quality occurs.

Effects of Embodiment

In this way, in the embodiment, reception section 105 in transmission apparatus 10 receives a CQI. Control section 106 determines MCS_A (upper limit value of the MCS index) using the CQI, determines MCS_B (lower limit value of the MCS index) based on parameters (here, packet size of transmission data) related to service quality required for a service communicated between transmission apparatus 10 and reception apparatus 20, and selects an MCS index from a selection range of the MCS index from MCS_B (lower limit value) or more to MCS_A (upper limit value) or less. Transmission section 103 then uses a coding and modulation scheme corresponding to the selected MCS index to transmit transmission data.

By doing so, according to the embodiment, because transmission apparatus 10 selects an MCS index that enables low latency while guaranteeing the predetermined error rate, transmission apparatus 10 can perform appropriate AMC control even when low latency is required like URLLC.

Modification 1 of Embodiment 1

In modification 1 of Embodiment 1, transmission apparatus 10 determines MCS_B (lower limit value of the selection range of the MCS index) based on the number of resource blocks (RBs) allocated to transmission data for reception apparatus 20 in addition to the packet size as the parameters related to service quality required for the service.

Specifically, control section 106 of transmission apparatus 10 calculates a transport block size (TBS per RB×RB number) in all RBs allocated to reception apparatus 20 by using a transport block size (that is, transport block size per RB) associated with each MCS index and the number of RBs allocated to reception apparatus 20.

Control section 106 then sets as MCS_B an MCS index that makes a packet size of data for reception apparatus 20 smaller than the calculated TBS in all the RBs. For example, control section 106 may set as MCS_B the maximum MCS index among MCS indexes that make the packet size smaller than the TBS in all the RBs. In other words, a multiplication value (TBS per RB×RB number) obtained by multiplying the transport block size calculated using MCS_B by the number of RBs to which transmission data is allocated becomes equal to or more than the packet size of transmission data.

This processing allows transmission apparatus 10 to prevent data to be transmitted from being divided and transmitted into more transport blocks than the number of transport blocks within which delay is allowed according to resource allocation to reception apparatus 20.

Modification 2 of Embodiment 1

In modification 2 of Embodiment 1, transmission apparatus 10 determines MCS_B (lower limit value of the selection range of the MCS index) based on the number of packets divided (packet division number) allowable for transmission data in addition to the packet size as the parameters related to service quality required for the service.

For example, control section 106 of transmission apparatus 10 determines a packet division number based on a delay requirement. Here, as a delay requirement, for example, a time (for example, 1 ms or the like) allowing delay is set. For example, delay of a predetermined unit (for example, slot unit) is increased in response to an increase in the packet division number. Therefore, control section 106 can calculate the packet division number within which delay is allowed based on the delay requirement (for example, delay allowable time).

Control section 106 then sets as MCS_B an MCS index that makes the packet size of data for reception apparatus 20 smaller than a multiplication value obtained by multiplying the transport block size associated with each MCS index by the packet division number within which delay is allowed. In other words, the multiplication value obtained by multiplying the transport block size calculated using MCS_B by the packet division number allowable for the transmission data becomes equal to or more than the packet size of transmission data.

This processing allows transmission apparatus 10 to prevent data to be transmitted from being divided into and transmitted by more transport blocks than the number of transport blocks within which delay is allowed according to a delay requirement for reception apparatus 20.

Modification 1 and modification 2 of Embodiment 1 may be combined. Specifically, transmission apparatus 10 may set as MCS_B an MCS index that makes the packet size of data for reception apparatus 20 smaller than a multiplication value obtained by multiplying the transport block size associated with each MCS index by the packet division number within which delay is allowed by the number of RBs allocated to reception apparatus 20. This processing allows transmission apparatus 10 to prevent data to be transmitted from being divided into and transmitted by more transport blocks than the number of transport blocks within which delay is allowed.

Modification 3 of Embodiment 1

Figure 6:
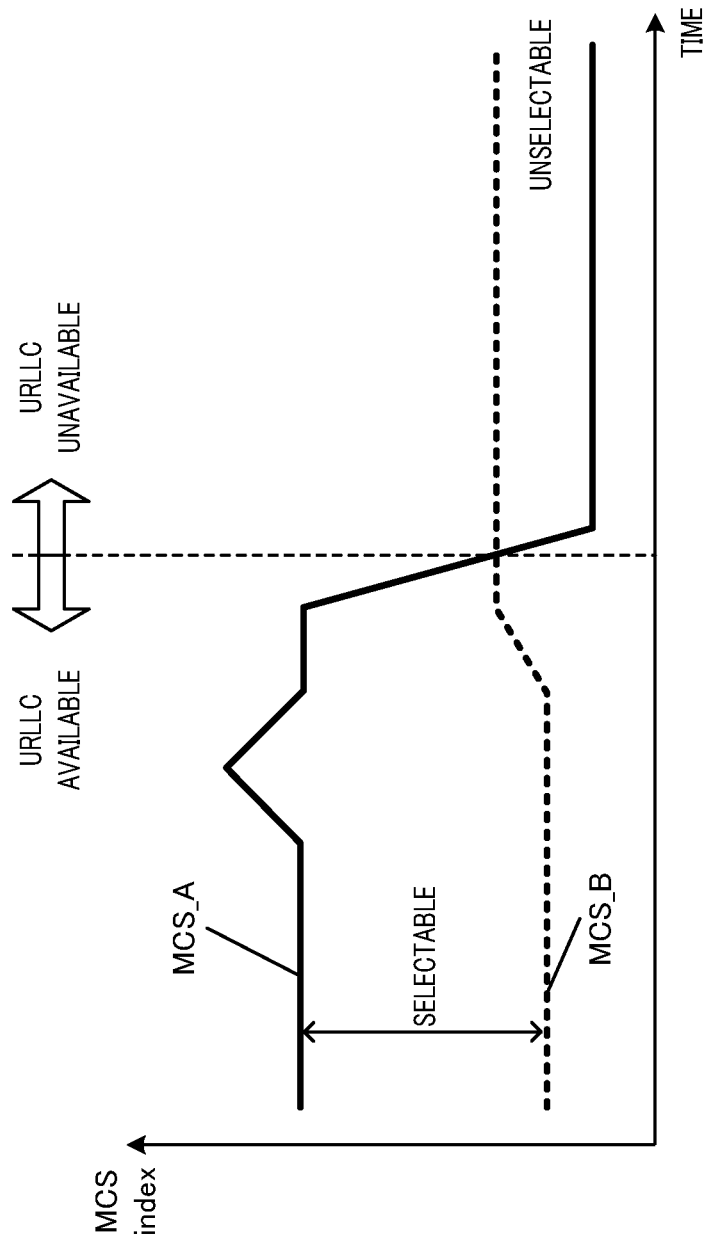
FIG. 6 illustrates an exemplary MCS selection processing according to modification 3 of Embodiment 1.

For example, as illustrated in FIG. 6, transmission apparatus 10 selects an MCS index within the selection range of the MCS index between MCS_A as the upper limit and MCS_B as the lower limit and thereby can perform communication (for example, URLLC) maintaining low latency while guaranteeing the error rate.

However, as illustrated in FIG. 6, there is a case where MCS_A becomes smaller than MCS_B (MCS_A<MCS_B) depending on a change in channel quality or packet size between transmission apparatus 10 and reception apparatus 20. The situation of MCS_A<MCS_B may occur, for example, when the channel quality gets bad and the value of MCS_A decreases, or when the packet size for reception apparatus 20 increases and the value of MCS_B increases.

In the case of MCS_A<MCS_B, it is impossible to achieve communication maintaining low latency while guaranteeing the error rate, and the requirement of URLLC cannot be satisfied. That is, in the case of MCS_A<MCS_B, transmission apparatus 10 cannot use the service of URLLC.

Therefore, in modification 3 of Embodiment 1, operation in the case of MCS_A<MCS_B will be described.

In the following, as an example, operation examples 1 to 3 of transmission apparatus 10 when MCS_A<MCS_B is assumed will be described.

Operation Example 1

In operation example 1, transmission apparatus 10 reduces the packet size of data for reception apparatus 20. Adjustment of the packet size may be carried out, for example, in an upper layer.

Reducing the packet size also reduces the transport block size by which delay is allowed. That is, transmission apparatus 10 can set MCS_B lower by reducing the packet size. For example, transmission apparatus 10 may set a packet size that causes the state of MCS_A≥MCS_B.

By this processing, MCS_B is set lower and the state of MCS_A≥MCS_B is obtained. In this state, transmission apparatus 10 can perform communication maintaining low latency while guaranteeing the error rate as described above.

Operation Example 2

In operation example 2, transmission apparatus 10 uses a method of improving communication quality.

As the method of improving communication quality, for example, in the state of MCS_A<MCS_B, transmission apparatus 10 may increase the number of antennas 104 used for data transmission or may increase transmission power of data transmission compared with the state of MCS_A≥MCS_B. Note that, the method of improving communication quality is not limited to those, and may be another method capable of improving communication quality.

By this processing, communication quality between transmission apparatus 10 and reception apparatus 20 is improved, so that channel quality measured in reception apparatus 20 becomes higher, and MCS_A is set higher. Therefore, the state of MCS_A<MCS_B changes to the state of MCS_A≥MCS_B, and transmission apparatus 10 can perform communication maintaining low latency while guaranteeing the error rate as described above.

Operation Example 3

In operation example 3, transmission apparatus 10 relaxes conditions required in an application.

For example, in the state of MCS_A<MCS_B, transmission apparatus 10 relaxes the conditions (for example, delay time or error rate) required in the application. For example, in the state of MCS_A<MCS_B, transmission apparatus 10 may select an MCS index between MCS_A and MCS_B, or may use a specified MCS index.

By this processing, transmission apparatus 10 can transmit transmission data using an MCS index satisfying the relaxed conditions.

Operation examples 1 to 3 have been described above. Transmission apparatus 10 may operate by combining at least two of operation examples 1 to 3.

In modification 3 of Embodiment 1, operation examples 1 and 2 have been described as operation examples to change from the state of MCS_A<MCS_B to the state of MCS_A≥MCS_B. However, operation to change to the state of MCS_A≥MCS_B is not limited to those. In order to change to the state of MCS_A≥MCS_B, another method to increase MCS_A may be used or another method to decrease MSC_B may be used.

During transition from the state of MCS_A<MCS_B to the state of MCS_A≥MCS_B by the above-described operation, transmission apparatus 10 may perform data transmission based on a predetermined MCS index. Here, the predetermined MCS index may be, for example, either MCS_A or MCS_B, or an MCS index (for example, mean value) obtained based on MCS_A and MCS_B, or a preset MCS index. By this processing, it is possible to prevent data transmission from transmission apparatus 10 from being interrupted and suppress an increase in delay.

In the embodiment, the processing has been described in which transmission apparatus 10 determines the upper limit value and lower limit value of the MCS index, for example, for the MCS table in which modulation multi-value numbers of the modulation scheme are in ascending order as illustrated in FIG. 2, and selects an MCS index from the selection range of the MCS index from the lower limit value or more to the upper limit value or less. Instead of determining the upper limit value and the lower limit value of the MCS index like this processing, transmission apparatus 10 may determine at least one candidate (first candidate) for the MCS index on the basis of the CQI, determine at least one candidate (second candidate) for the MCS index based on parameters (for example, packet size of transmission data) related to service quality required for the service communicated between transmission apparatus 10 and reception apparatus 20, and select an MCS index included in both first candidates and second candidates. In this way, for an MCS table (not illustrated) defined by different methods (for example, in the case where the modulation multi-value numbers are in descending order or the case where the modulation multi-value numbers are not in a relation of ascending/descending order) without being limited to the MCS table in which the modulation multi-value numbers of the modulation scheme are in ascending order as illustrated in FIG. 2, transmission apparatus 10 can select an MCS index enabling low latency while guaranteeing the predetermined error rate in the same manner as the embodiment.

Embodiment 2

In Embodiment 1, the method of selecting an MCS index in the transmission apparatus when low latency is required has been described, whereas in a present embodiment, a method of selecting a CQI index in the reception apparatus when low latency is required will be described.

Figure 7:
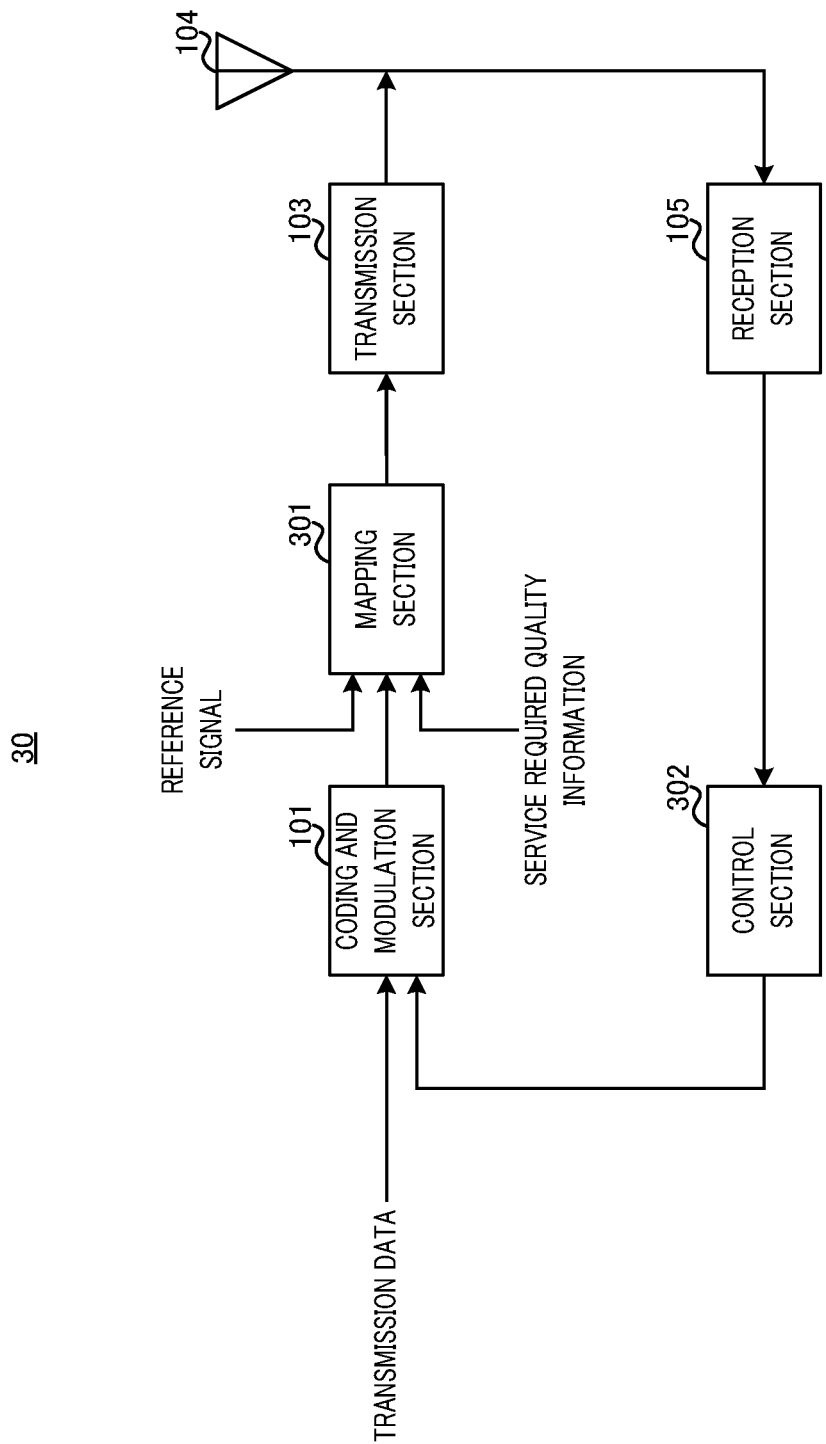
FIG. 7 is a block diagram illustrating an exemplary configuration of a transmission apparatus according to Embodiment 2.
Figure 8:
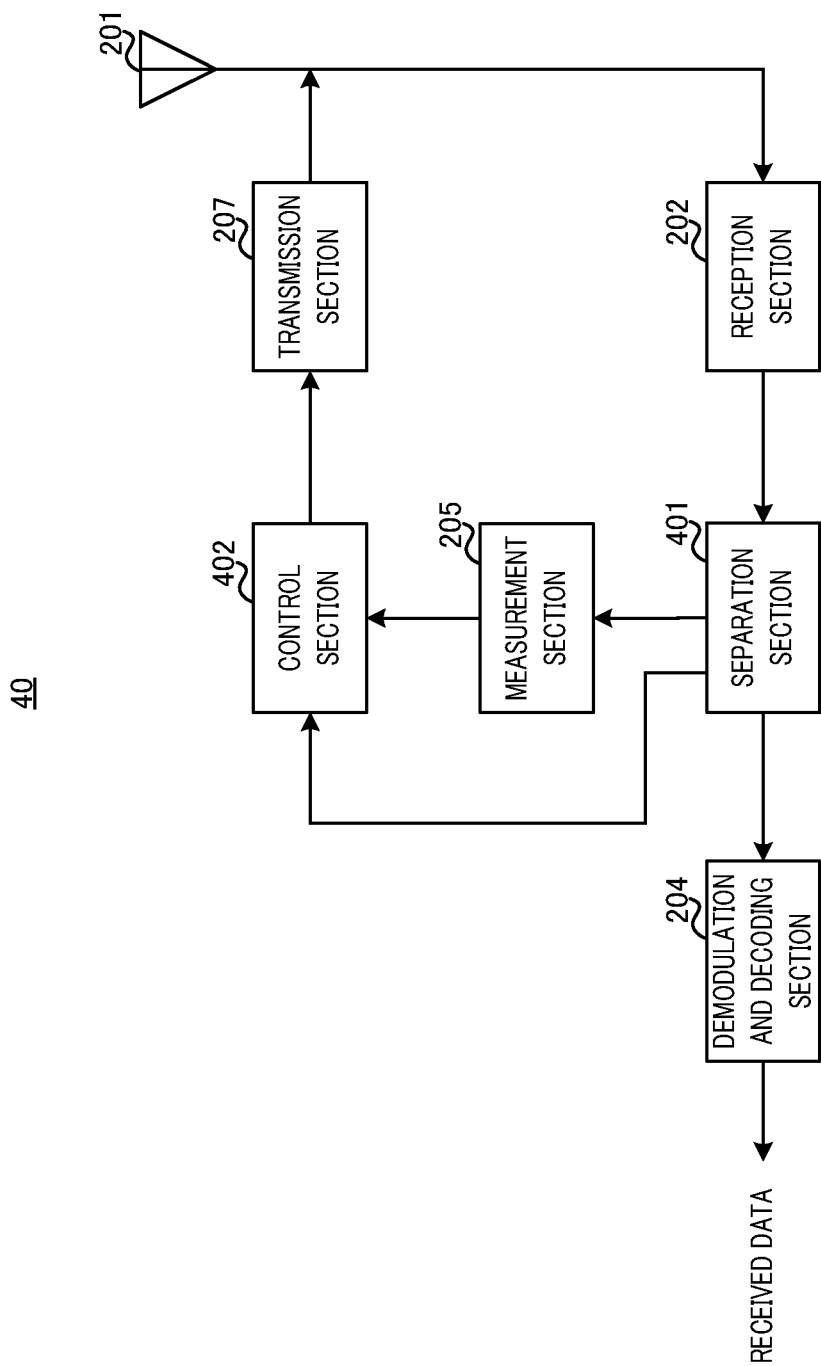
FIG. 8 is a block diagram illustrating an exemplary configuration of a reception apparatus according to Embodiment 2.

A radio communication system according to the present embodiment includes at least transmission apparatus 30 illustrated in FIG. 7 and reception apparatus 40 illustrated in FIG. 8. In FIGS. 7 and 8, the same reference numerals are given to components performing the same operations as those in Embodiment 1 (FIGS. 3 and 4), and description thereof is omitted.

In transmission apparatus 30 illustrated in FIG. 7, mapping section 301 maps information (hereinafter "service requirement quality information") related to service quality required for a service communicated between transmission apparatus 30 and reception apparatus 40 to a predetermined radio resource in addition to the operation of Embodiment 1 (mapping section 102). That is, transmission apparatus 30 transmits the service requirement quality information to reception apparatus 40.

Examples of the service requirement quality information include an error rate of data transmitted from transmission apparatus 30 to reception apparatus 40, delay allowable in data transmission, a packet size of data to be transmitted, and the like. The service requirement quality information may be at least one of the error rate, delay, and packet size, or may be other parameters on the service other than that information.

Control section 302 selects an MCS index on the basis of a CQI index fed back from reception apparatus 40, and outputs the selected MCS index to coding and modulation section 101. For example, control section 302 may select an MCS index according to the method illustrated in FIG. 1.

On the other hand, in reception apparatus 40 illustrated in FIG. 8, separation section 401 separates the service requirement quality information transmitted from transmission apparatus 30 from a reception signal in addition to the operation of Embodiment 1 (separation section 203) and outputs it to control section 402.

Control section 402 determines a CQI index based on a measurement value of channel quality input from measurement section 205 and the service requirement quality information input from separation section 401. Control section 402 outputs CQI information indicating the determined CQI index to transmission section 207.

CQI Index Selection Method

Next, a method of selecting a CQI index in above-mentioned reception apparatus 40 will be described in detail.

Reception apparatus 40 (control section 402) limits a range of the CQI index selectable for data based on the channel quality measured in reception apparatus 40 and the service requirement quality information notified from transmission apparatus 30.

Figure 9:
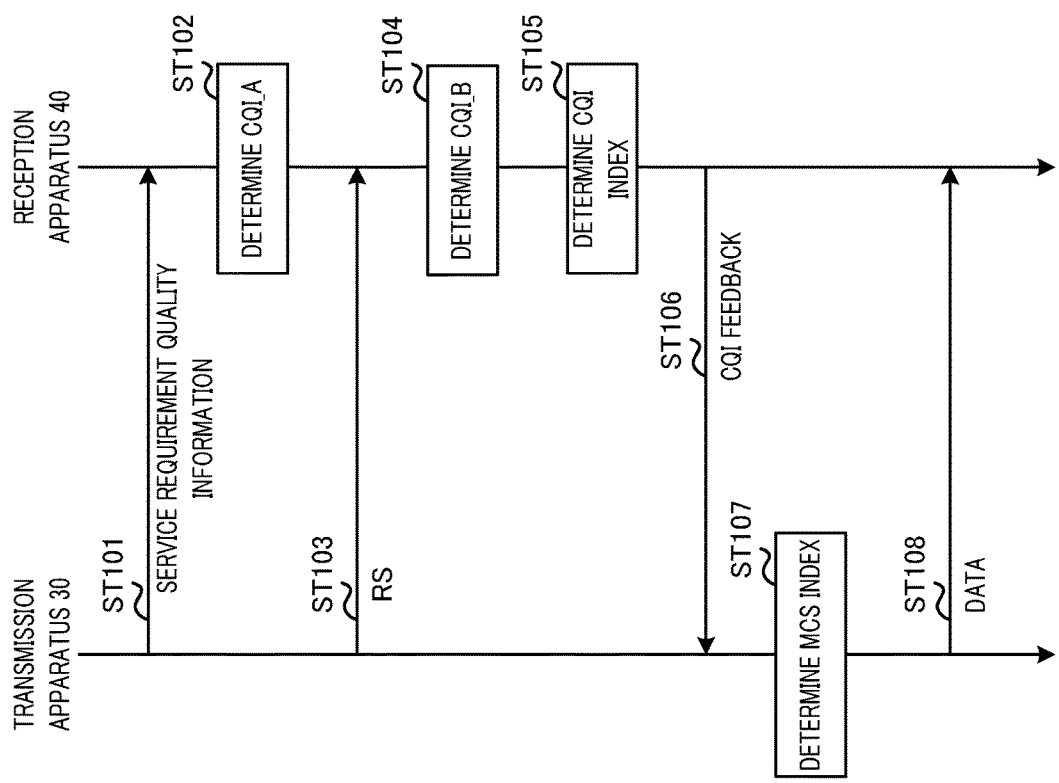
FIG. 9 is a sequence diagram illustrating an exemplary operation of the transmission apparatus and the reception apparatus according to Embodiment 2.
Figure 10:
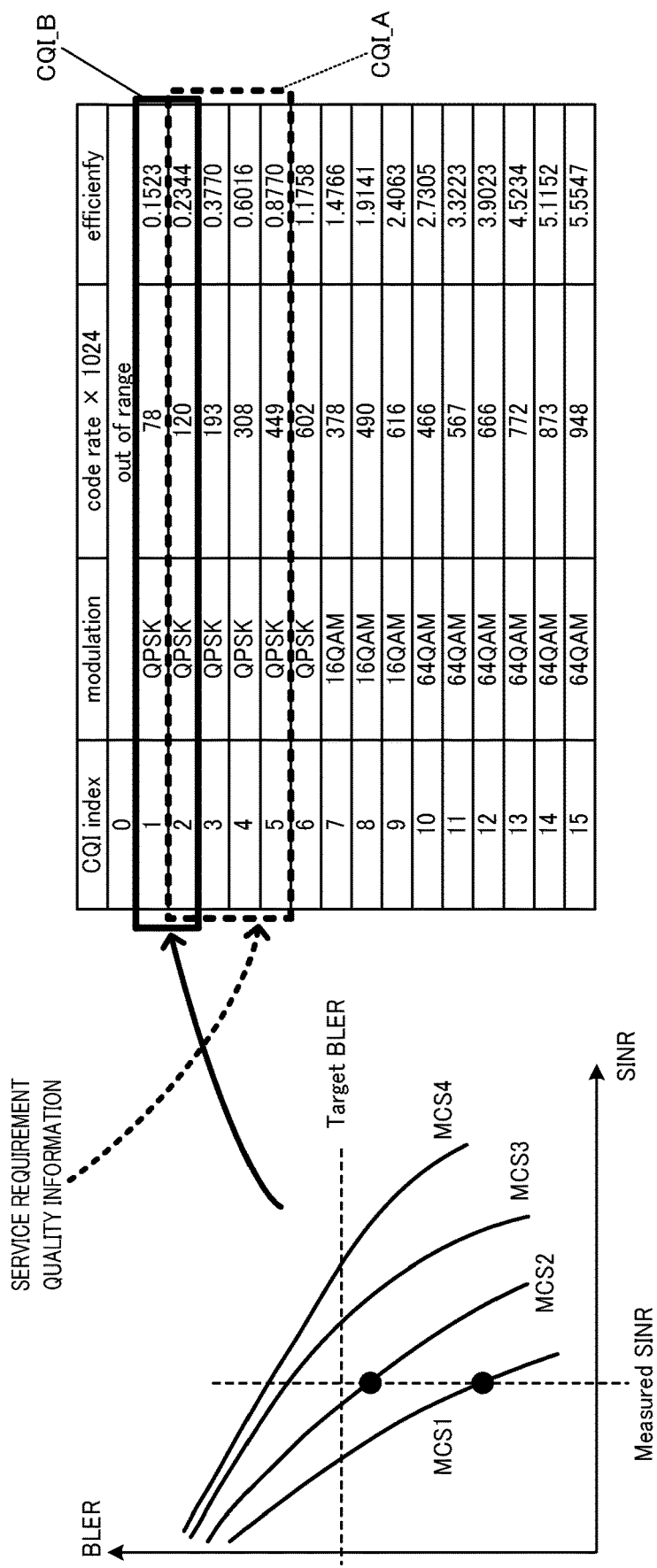
FIG. 10 illustrates an exemplary CQI selection processing according to Embodiment 2.

FIG. 9 is a sequence diagram illustrating an exemplary operation of transmission apparatus 30 and reception apparatus 40 according to the embodiment. FIG. 10 illustrates an exemplary CQI index selection method according to the embodiment.

In FIG. 9, transmission apparatus 30 notifies reception apparatus 40 of service requirement quality information (ST101). Reception apparatus 40 determines at least one CQI index (CQI candidate, hereinafter referred to as "CQI_A") based on the service requirement quality information notified in ST101 from a plurality of CQI (CQI indexes) (ST102). For example, reception apparatus 40 may select a CQI index satisfying service required quality indicated in the service requirement quality information as CQI_A. In the example illustrated in FIG. 10, reception apparatus 40 selects CQI indexes=2 to 5 (a range surrounded by a dotted line) as CQI_Abased on the service requirement quality information. Noted that, a method of selecting CQI_A will be described later in detail.

Next, transmission apparatus 30 transmits a reference signal (RS) to reception apparatus 40 (ST103). Reception apparatus 40 determines at least one CQI index (CQI candidate, hereinafter referred to as "CQI_B") (ST104), for example, based on the measurement value (SINR in FIG. 10) of the channel quality in the same manner as the method illustrated in FIG. 1. In the example illustrated in FIG. 10, reception apparatus 40 selects CQI indexes 1 and 2 (a range surrounded by a solid line) that satisfy a target error rate (Target BLER) as CQI_B based on the measured SINR.

Reception apparatus 40 then determines one CQI index from CQI indexes included in both CQI_A determined in ST102 and CQI_B determined in ST104 (ST105). In the example illustrated in FIG. 10, reception apparatus 40 selects the CQI index=2 included in both CQI_A and CQI_B.

Reception apparatus 40 feeds back the selected CQI index to transmission apparatus 30 (ST106).

Transmission apparatus 30 then determines an MCS index corresponding to the CQI index fed back from reception apparatus 40 (ST107), and transmits data encoded and modulated using the determined MCS index to reception apparatus 40 (ST108).

Here, by feeding back the CQI index included in CQI_B determined based on the channel quality (target error rate) to transmission apparatus 30, the predetermined error rate can be guaranteed with respect to the data transmitted from transmission apparatus 30

In addition, by feeding back the CQI index included in CQI_A determined based on the service requirement quality information to transmission apparatus 30, it is possible to satisfy the service quality required for the data transmitted from transmission apparatus 30.

That is, by feeding back the CQI index included in both CQI_A and CQI_B to transmission apparatus 30, it is possible to guarantee the required service quality (for example, low latency or the like) while guaranteeing the predetermined error rate with respect to the data transmitted from transmission apparatus 30.

Next, selection methods 1 to 4 will be described as examples of CQI_A selection methods (processing in ST102 illustrated in FIG. 9).

Selection Method 1

In selection method 1, delay required in a service (for example, allowable delay time) is notified to reception apparatus 40 as service requirement quality information.

Reception apparatus 40 selects CQI_A based on delay indicated in the service requirement quality information. That is, reception apparatus 40 selects a CQI index corresponding to a combination of a coding rate and a modulation scheme (that is, MCS) that allows transmission apparatus 30 to transmit data within an allowable range of delay indicated in the service requirement quality information. Note that, because reception apparatus 40 does not know a packet size of data to be received, reception apparatus 40 may select CQI_A, for example, by assuming an arbitrary packet size.

For example, when the delay indicated in the service requirement quality information is small (that is, the delay requirement is severe), reception apparatus 40 selects a modulation scheme corresponding to a low order or a CQI index corresponding to a low coding rate as CQI_A. Stable communication can be performed between transmission apparatus 30 and reception apparatus 40 by the modulation scheme corresponding to a low order or the low coding rate, and an occurrence probability of retransmission caused by reception errors can be reduced, and low latency can be achieved.

Selection Method 2

In selection method 2, an error rate required in the service is notified to reception apparatus 40 as the service requirement quality information.

Reception apparatus 40 selects CQI_A based on an error rate indicated in the service requirement quality information. That is, reception apparatus 40 selects a CQI index corresponding to a combination of a coding rate and a modulation scheme (that is, MCS) that enables data transmission at the error rate or less indicated in the service requirement quality information in transmission apparatus 30.

For example, when the error rate indicated in the service requirement quality information is low (that is, when the error rate requirement is severe), reception apparatus 40 selects a modulation scheme corresponding to a low order or a CQI index corresponding to a low coding rate as CQI_A. Stable communication can be performed between transmission apparatus 30 and reception apparatus 40 by the modulation scheme corresponding to a low order or the low coding rate, and an occurrence probability of retransmission caused by reception errors can be reduced, and low latency can be achieved.

Selection Method 3

In selection method 3, a packet size of transmission data is notified to reception apparatus 40 as the service requirement quality information.

Reception apparatus 40 selects CQI_A based on a packet size indicated in the service requirement quality information. That is, reception apparatus 40 selects a CQI index corresponding to a combination of a coding rate and a modulation scheme (that is, MCS) that allows transmission apparatus 30 to transmit data of the packet size indicated in the service requirement quality information within a predetermined time. Specifically, using an assumed number of RBs and the notified packet size, reception apparatus 40 selects a CQI index from which transmission apparatus 30 can select an MCS index that enables transmission within the predetermined time. Note that, the assumed number of RBs may be arbitrarily set, or may be regularly notified to reception apparatus 40. Here, the predetermined time is, for example, a time corresponding to the number of transport blocks (that is, the number of packet divisions) that can be transmitted within an allowable delay time.

This processing allows transmission apparatus 30 to transmit data within the delay time allowable in the service, achieving low latency.

Selection Method 4

In selection method 4, a packet size of transmission data and delay required in a service (for example, allowable delay time) are notified to reception apparatus 40 as the service requirement quality information. That is, selection method 4 is a method combining selection method 1 and selection method 3.

Reception apparatus 40 selects CQI_A based on a packet size and delay indicated in the service requirement quality information. That is, reception apparatus 40 selects a CQI index corresponding to a combination of a coding rate and a modulation scheme (that is, MCS) that allows transmission apparatus 30 to transmit data of the packet size indicated in the service requirement quality information within the delay time indicated in the service requirement quality information.

This processing allows transmission apparatus 30 to transmit data within the delay time allowable in the service, achieving low latency.

Selection method 4 is the method combining selection method 1 and selection method 3, but may use other combinations of selection methods 1 to 3. That is, it may be a combination of selection methods 1 and 2, may be a combination of selection methods 2 and 3, or may be a combination of selection methods 1 to 3.

Selection methods 1 to 4 have been described above.

Service Requirement Quality Information Notification Method

Next, a service requirement quality information notification method (processing in ST101 illustrated in FIG. 9) will be described.

FIG. 11 illustrates an example of the service requirement quality information.

In FIG. 11, the service requirement quality information includes the packet size of data and delay (time) allowable in the service. As illustrated in FIG. 11, a combination of the packet size and delay is associated with the index.

For example, transmission apparatus 30 and reception apparatus 40 share in advance the association between the index and service requirement quality information (packet size and delay) illustrated in FIG. 11. Transmission apparatus 30 notifies reception apparatus 40 of an index associated with service requirement quality information requested in an application among indexes 0 to 15 illustrated in FIG. 11.

Reception apparatus 40 then receives the index notified from transmission apparatus 30 and identifies the service requirement quality information (packet size and delay) associated with the received index.

By this processing, an amount of signaling can be reduced compared with the case where values of parameters indicated in the service requirement quality information are notified as is.

Note that, timing to notify the service requirement quality information from transmission apparatus 30 to reception apparatus 40 (processing in ST101 illustrated in FIG. 9) is not limited to timing (before transmission of the reference signal) illustrated in FIG. 9. For example, the notification of the service requirement quality information may be performed simultaneously with the transmission of the reference signal or may be performed at later timing than the transmission of the reference signal.

In the embodiment, the method of notifying the signaling (index) indicating the service requirement quality information from transmission apparatus 30 to reception apparatus 40 has been described. However, service requirement quality information notification methods are not limited to that method. For example, the service requirement quality information may be associated with another parameter. On receiving the other parameter, reception apparatus 40 may identify service requirement quality information associated with the other parameter, and select a CQI index based on the identified service requirement quality information. That is, the service requirement quality information may be implicitly notified from transmission apparatus 30 to reception apparatus 40. For example, reception apparatus 40 may estimate service required quality based on packet sizes transmitted in the past, a packet transmission frequency, and an adopted retransmission scheme, and perform selection processing of the CQI index based on the estimated service requirement quality information. As a result of this processing, signaling for explicitly notifying the service requirement quality information (processing in ST101 illustrated in FIG. 9) becomes unnecessary, so that the signaling overhead can be reduced.

The configuration (packet size and delay) and numerical values of the service requirement quality information illustrated in FIG. 11 are mere examples and other parameters and other numerical values may be used. In addition, 16 combinations (indexes 0 to 15) of packet sizes and delays illustrated in FIG. 11 are mere examples and the number of combinations is not limited to 16.

The service requirement quality information notification method has been described above.

Effects of Embodiment

In this way, in the embodiment, control section 402 in reception apparatus 40 determines at least one CQI_B (first CQI candidate) based on a measurement value of channel quality between transmission apparatus 30 and reception apparatus 40, determines at least one CQI_A (second CQI candidate) based on service requirement quality information on a service between transmission apparatus 30 and reception apparatus 40, and selects a CQI (CQI index) included in both CQI_A and CQI_B. Transmission section 207 then transmits the selected CQI to transmission apparatus 30. Reception section 202 receives transmission data transmitted by using a coding and modulation scheme corresponding to an MCS index corresponding to the selected CQI.

By doing so, according to the embodiment, reception apparatus 40 selects the CQI enabling low latency while guaranteeing a predetermined error rate, and thereby can perform appropriate AMC control even in the case where low latency is required like URLLC.

Note that, in the embodiment, if there is not any CQI included in both CQI_A determined based on the service requirement quality information and CQI_B determined based on the channel quality, reception apparatus 40 may select a CQI index based on another method.

As another method, for example, reception apparatus 40 may select a CQI index included in either CQI_A or CQI_B, or may select a prescribed CQI index. This processing allows reception apparatus 40 to feed back a CQI index to transmission apparatus 30 and receive transmission data from transmission apparatus 30 even if there is not any CQI included in both CQI_A and CQI_B, thereby delay in data transmission can be suppressed.

As another method, reception apparatus 40 may adjust (relax) values of parameters (for example, delay, packet size, and error rare) indicated in the service requirement quality information or a value of the measured channel quality (for example, measured SINR or Target SINR), and thereby widen a range of CQI indexes selected as CQI_A or CQI_B. This processing widens the range of CQI_A or the range of CQI_B, and thereby increases a possibility that there is a CQI index included in both CQI_A and CQI_B. Therefore, reception apparatus 40 can select a CQI index and feedback it to transmission apparatus 30.

In the embodiment, as an example, CQI_A (CQI indexes=2 to 5) and CQI_B (CQI indexes=1 and 2) illustrated in FIG. 10 have been described. However, CQI_A and CQI_B are not limited to the case where they are composed of consecutive CQI indexes as illustrated in FIG. 10 and may be composed of non-consecutive CQI indexes.

The embodiments have been described above.

In the above-described embodiments, the case where transmission apparatuses 10 and 30 select an MCS index (for example, see FIG. 2) indicating a combination of a coding rate and a modulation scheme based on information (for example, CQI) fed back from reception apparatuses 20 and 40 has been described. However, a value which transmission apparatuses 10 and 30 select based on information fed back from reception apparatuses 20 and 40 is not limited to the MCS index (that is, a value indicating a coding and modulation scheme) and may be any value to be used for transmission data.

In the above-described embodiments, information fed back from reception apparatuses 20 and 40 to transmission apparatuses 10 and 30 is not limited to the CQI and may be any channel quality information for selecting an MCS index in transmission apparatuses 10 and 30.

In the above-described embodiments, as an example, the cases of using the CQI table illustrated in FIG. 1 and the MCS table illustrated in FIG. 2 have been described. However, configurations of the CQI table and MCS table are not limited to the configurations illustrated in FIG. 1 and FIG. 2.

In the above-described embodiments, as an example of services requiring low latency, URLLC has been described. However, services requiring low latency are not limited to URLLC, and may be other services (for example, enhanced Mobile Broadband (eMBB), massive Machine Type Communications (mMTC), or the like).

Hardware Configuration

Note that the block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 12:
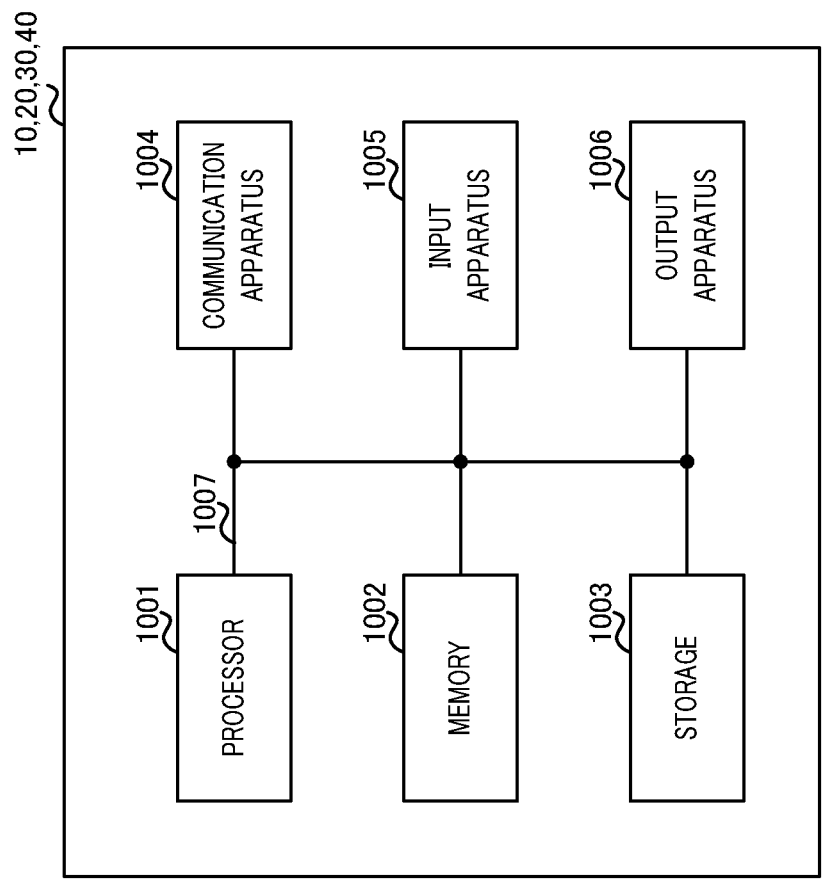
FIG. 12 illustrates an exemplary hardware configuration of a radio base station and a user terminal according to the present invention.

For example, transmission apparatus and reception apparatus (for example, the radio base station, the user terminal, and the like) according to an embodiment of the present invention may function as a computer that executes processing of a radio communication method of the present invention. FIG. 12 illustrates an example of a hardware configuration of transmission apparatus and reception apparatus (for example, the radio base station and the user terminal) according to an embodiment of the present invention. Transmission apparatuses 10 and 30, and reception apparatuses 20 and 40 as described above may be physically constituted as a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of transmission apparatuses 10 and 30, and reception apparatuses 20 and 40 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in transmission apparatuses 10 and 30, and reception apparatuses 20 and 40 are implemented by pre-determined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, above-described coding and modulation section 101, mapping sections 102 and 301, control sections 106, 206, 302, and 402, separation sections 203 and 401, demodulation and decoding section 204, measurement section 205, and the like may be implemented by processor 1001.

Processor 1001 reads out a program (program code), a software module, or data from storage 1003 and/or communication apparatus 1004 to memory 1002 and executes various types of processing according to the read-out program or the like. The program used is a program for causing the computer to execute at least part of the operation described in the embodiments. For example, control sections 106 and 302 of transmission apparatuses 10 and 30, and control sections 206 and 402 of reception apparatuses 20 and 40 may be implemented by a control program stored in memory 1002 and operated by processor 1001, and the other functional blocks may also be implemented in the same way. While it has been described that the various types of processing as described above are executed by one processor 1001, the various types of processing may be executed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the radio communication method according to an embodiment of the present invention.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blue-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be a database, server, or other appropriate media including memory 1002 and/or storage 1003.

Communication apparatus 1004 is hardware (transmission and reception device) for communication between computers through a wired and/or wireless network and is also called, for example, a network device, a network controller, a network card, or a communication module. For example, transmission sections 103 and 207, antennas 104 and 201, reception sections 105 and 202, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, transmission apparatuses 10 and 30, and reception apparatuses 20 and 40 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

Notification and Signaling of Information

The notification of information is not limited to the aspects or embodiments described in the present specification, and the information may be notified by another method. For example, the notification of information may be carried out by one or a combination of physical layer signaling (for example, DCI (Downlink Control Information) and UCI (Uplink Control Information)), higher layer signaling (for example, RRC (Radio Resource Control) signaling, MAC (Medium Access Control) signaling, broadcast information (MIB (Master Information Block), and SIB (System Information Block))), and other signals. The RRC signaling may be called an RRC message and may be, for example, an RRC connection setup message, an RRC connection reconfiguration message, or the like.

Adaptive System

The aspects and embodiments described in the present specification may be applied to a system using LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other appropriate systems and/or to a next-generation system extended based on the above systems.

Processing Procedure and the Like

The orders of the processing procedures, the sequences, the flow charts, and the like of the aspects and embodiments described in the present specification may be changed as long as there is no contradiction. For example, elements of various steps are presented in exemplary orders in the methods described in the present specification, and the methods are not limited to the presented specific orders.

Operation of Base Station

Specific operations which are described in the specification as being performed by the base station (radio base station) may sometimes be performed by an upper node depending on the situation. Various operations performed for communication with a terminal in a network constituted by one network node or a plurality of network nodes including a base station can be obviously performed by the base station and/or a network node other than the base station (examples include, but not limited to, MME (Mobility Management Entity) or S-GW (Serving Gateway)). Although there is one network node in addition to the base station in the case illustrated above, a plurality of other network nodes may be combined (for example, MME and S-GW).

Direction of Input and Output

The information, the signals, and the like can be output from a higher layer (or a lower layer) to a lower layer (or a higher layer). The information, the signals, and the like may be input and output through a plurality of network nodes.

Handling of Input and Output Information and the Like

The input and output information and the like may be saved in a specific place (for example, memory) or may be managed by a management table. The input and output information and the like can be overwritten, updated, or additionally written. The output information and the like may be deleted. The input information and the like may be transmitted to another apparatus.

Determination Method

The determination may be made based on a value expressed by one bit (0 or 1), based on a Boolean value (true or false), or based on comparison with a numerical value (for example, comparison with a predetermined value).

Software

Regardless of whether the software is called software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, and the like may be transmitted and received through a transmission medium. For example, when the software is transmitted from a website, a server, or another remote source by using a wired technique, such as a coaxial cable, an optical fiber cable, a twisted pair, and a digital subscriber line (DSL), and/or a wireless technique, such as an infrared ray, a radio wave, and a microwave, the wired technique and/or the wireless technique is included in the definition of the transmission medium.

Information and Signals

The information, the signals, and the like described in the present specification may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present specification and/or the terms necessary to understand the present specification may be replaced with terms with the same or similar meaning. For example, the channel and/or the symbol may be a signal. The signal may be a message. The component carrier (CC) may be called a carrier frequency, a cell, or the like.

"System" and "Network"

The terms "system" and "network" used in the present specification can be interchangeably used.

Names of Parameters and Channels

The information, the parameters, and the like described in the present specification may be expressed by absolute values, by values relative to predetermined values, or by other corresponding information. For example, radio resources may be indicated by indices.

The names used for the parameters are not limited in any respect. Furthermore, the numerical formulas and the like using the parameters may be different from the ones explicitly disclosed in the present specification. Various channels (for example, PUCCH and PDCCH) and information elements (for example, TPC) can be identified by any suitable names, and various names assigned to these various channels and information elements are not limited in any respect.

Base Station

The base station (radio base station) can accommodate one cell or a plurality of (for example, three) cells (also called sector). When the base station accommodates a plurality of cells, the entire coverage area of the base station can be divided into a plurality of smaller areas, and each of the smaller areas can provide a communication service based on a base station subsystem (for example, small base station for indoor, remote radio head (RRH)). The term "cell" or "sector" denotes part or all of the coverage area of the base station and/or of the base station subsystem that perform the communication service in the coverage. Furthermore, the terms "base station," "eNB," "cell," and "sector" can be interchangeably used in the present specification. The base station may be called a fixed station, a NodeB, an eNodeB (eNB), an access point, a femto cell, a small cell, or the like.

Terminal

The user terminal may be called, by those skilled in the art, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or UE (User Equipment) or by some other appropriate terms.

Meaning and Interpretation of Terms

As used herein, the term "determining" may encompass a wide variety of actions. For example, "determining" may be regarded as judging, calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing and the like. That is, "determining" may be regarded as a certain type of action related to determining.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. When the terms are used in the present specification, two elements can be considered to be "connected" or "coupled" to each other by using one or more electrical wires, cables, and/or printed electrical connections or by using electromagnetic energy, such as electromagnetic energy with a wavelength of a radio frequency domain, a microwave domain, or an optical (both visible and invisible) domain that are non-limiting and non-inclusive examples.

The reference signal can also be abbreviated as RS and may also be called a pilot depending on the applied standard.

The description "based on" used in the present specification does not mean "based only on," unless otherwise specifically stated. In other words, the description "based on" means both of "based only on" and "based at least on."

The "section" in the configuration of each apparatus may be replaced with "means," "circuit," "device," or the like.

The terms "including," "comprising," and modifications of these terms are intended to be inclusive just like the term "having," as long as the terms are used in the present specification or the appended claims. Furthermore, the term "or" used in the present specification or the appended claims is not intended to be an exclusive or.

The resource block is a resource assignment unit in the time domain and the frequency domain, and the resource block may include one subcarrier or a plurality of continuous subcarriers in the frequency domain. In addition, the resource block may include one symbol or a plurality of symbols in the time domain, and may have a length of one slot, one minislot, one subframe, or one TTI. One TTI and one subframe may be constituted by one resource block or a plurality of resource blocks. The resource block may be called a resource unit, a physical resource block (PRB: Physical RB), a PRB pair, an RB pair, a scheduling unit, a frequency unit, or a subband. The resource block may be constituted by one RE or a plurality of REs. For example, one RE only has to be a resource smaller in unit size than the resource block serving as a resource assignment unit (for example, one RE only has to be a minimum unit of resource), and the naming is not limited to RE.

When articles, such as "a," "an," and "the" in English, are added by translation in the entire disclosure, the articles include plural forms unless otherwise clearly indicated by the context.

Variations and the Like of Aspects

The aspects and embodiments described in the present specification may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present invention has been described in detail, it is obvious to those skilled in the art that the present invention is not limited to the embodiments described in the present specification. Modifications and variations of the aspects of the present invention can be made without departing from the spirit and the scope of the present invention defined by the description of the appended claims. Therefore, the description of the present specification is intended for exemplary description and does not limit the present invention in any sense.

INDUSTRIAL APPLICABILITY

An aspect of the present invention is useful for a mobile communication system.

REFERENCE SIGNS LIST

10, 30 Transmission Apparatus
20, 40 Reception Apparatus
101 Coding and Modulation Section
102, 301 Mapping Section
103, 207 Transmission Section
104, 201 Antenna
105, 202 Reception Section
106, 206, 302, 402 Control Section
203, 401 Separation Section
204 Demodulation and Decoding Section
205 Measurement Section

The invention claimed is:

1. A transmission apparatus, comprising:
a receiver that receives channel quality information communicated between the transmission apparatus and a reception apparatus;

a processor that determines one or more first candidates for a value indicating a coding and modulation scheme based on the channel quality information, determines one or more second candidates for a value indicating the coding and modulation scheme based on a parameter related to service quality required for a service communicated between the transmission apparatus and the reception apparatus, and selects a value included in the first candidates as an upper limit of a selection range and in the second candidates as a lower limit of the selection range; and a transmitter that transmits transmission data, using the coding and modulation scheme corresponding to the selected value.

2. The transmission apparatus according to claim 1, wherein:

the parameter related to service quality includes at least a packet size of the transmission data, and the processor determines as second candidate the value(s) corresponding to a transport block size enabling transmission of the transmission data of the packet size using a predetermined number of transport blocks.

3. A reception apparatus, comprising:

a processor that determines one or more first channel quality information candidates based on a measurement value of channel quality between a transmission apparatus and the reception apparatus, determines one or more second channel quality information candidates based on a parameter related to service quality required for a service communicated between the transmission apparatus and the reception apparatus, and selects channel quality information included in the first channel quality information candidates as an upper limit of a selection range and in the second channel quality information candidates as a lower limit of the selection range;

a transmitter that transmits the selected channel quality information to the transmission apparatus; and a receiver that receives transmission data transmitted by the transmission apparatus using a coding and modulation scheme corresponding to the selected channel quality information.

4. The reception apparatus according to claim 3, wherein the receiver receives the parameter related to service quality from the transmission apparatus.

5. A communication method, comprising:

receiving channel quality information communicated between a transmission apparatus and a reception apparatus;

determining one or more first candidates for a value indicating a coding and modulation scheme based on the channel quality information, determining one or more second candidates for a value indicating the coding and modulation scheme based on a parameter related to service quality required for a service communicated between the transmission apparatus and the reception apparatus, and selecting a value included in the first candidates as an upper limit of a selection range and in the second candidates as a lower limit of the selection range; and transmitting transmission data by the transmission apparatus using the coding and modulation scheme corresponding to the selected value.

6. A communication method, comprising:

determining one or more first channel quality information candidates based on a measurement value of channel quality between a transmission apparatus and a reception apparatus, determining one or more second channel quality information candidates based on a parameter related to service quality required for a service communicated between the transmission apparatus and the reception apparatus, and selecting channel quality information included in the first channel quality information candidates as an upper limit of a selection range and in the second channel quality information candidates as a lower limit of the selection range;

transmitting the selected channel quality information to the transmission apparatus; and receiving transmission data transmitted by transmission apparatus using a coding and modulation scheme corresponding to the selected channel quality information.

* * * * *